(12) United States Patent
Yamamoto et al.

(10) Patent No.: US 10,035,717 B2
(45) Date of Patent: Jul. 31, 2018

(54) DEVICE FOR KILLING MICROORGANISMS WITHIN BALLAST WATER

(71) Applicant: PANASONIC INTELLECTUAL PROPERTY MANAGEMENT CO., LTD., Osaka (JP)

(72) Inventors: Hiroshi Yamamoto, Osaka (JP); Akiyoshi Edagawa, Hyogo (JP); Masafumi Sasai, Osaka (JP); Takuya Kotanagi, Osaka (JP); Hirohumi Minami, Osaka (JP); Hideki Nagaoka, Nara (JP); Masafumi Nishimoto, Aichi (JP); Takashi Sakakibara, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/115,056

(22) PCT Filed: Oct. 23, 2014

(86) PCT No.: PCT/JP2014/005391
§ 371 (c)(1),
(2) Date: Jul. 28, 2016

(87) PCT Pub. No.: WO2015/118584
PCT Pub. Date: Aug. 13, 2015

(65) Prior Publication Data
US 2016/0340213 A1 Nov. 24, 2016

(30) Foreign Application Priority Data
Feb. 7, 2014 (JP) .................................. 2014-022595

(51) Int. Cl.
*C02F 5/00* (2006.01)
*C02F 1/467* (2006.01)
(Continued)

(52) U.S. Cl.
CPC .............. *C02F 1/4674* (2013.01); *B63J 4/002* (2013.01); *C02F 5/00* (2013.01);
(Continued)

(58) Field of Classification Search
CPC ..... C02F 1/4674; C02F 5/00; C02F 2103/008; C02F 2303/04; C02F 2001/46157; B63J 4/002
See application file for complete search history.

(56) References Cited

U.S. PATENT DOCUMENTS 5,314,589 A * 5/1994 Hawley ................. C02F 1/4674
204/276
2008/0277274 A1 11/2008 Kim et al.
(Continued)

FOREIGN PATENT DOCUMENTS

JP 3-192 1/1991
JP 2003-220389 8/2003
(Continued)

OTHER PUBLICATIONS

Search Report issued in Japan Patent Application No. PCT/JP2014/005391, dated Dec. 2, 2014.
(Continued)

*Primary Examiner* — Walter Dean Griffin
*Assistant Examiner* — Cameron J Allen
(74) *Attorney, Agent, or Firm* — Greenblum & Bernstein, P.L.C.

(57) ABSTRACT

To provide a voltage-type device for killing microorganisms in which a microorganism killing effect is high and scale is less likely to clog up through holes in electrodes. The device for killing microorganisms includes: a main body which a liquid to be treated flows in at one end and flows out at the other end; opposed electrodes that are arranged in the main body in parallel with a flow of the liquid to be treated and have mutually-opposed through holes; and a voltage source of which an anode is connected to one of the opposed electrodes and a cathode is connected to the other of them. When a straightened liquid to be treated is passed through the device for killing microorganisms, a stirring action is
(Continued)

produced between the opposed electrodes, whereby hypochlorous acid can be diffused throughout the entire device and a high killing effect can be obtained.

6 Claims, 5 Drawing Sheets

(51) Int. Cl.
    *B63J 4/00*     (2006.01)
    *C02F 1/461*     (2006.01)
    *C02F 103/00*     (2006.01)

(52) U.S. Cl.
    CPC ............... *C02F 2001/46157* (2013.01); *C02F 2103/008* (2013.01); *C02F 2303/04* (2013.01)

(56) References Cited

U.S. PATENT DOCUMENTS

| | | | |
|---|---|---|---|
| 2013/0032491 A1* | 2/2013 | Nitta | ............... C02F 1/46109 205/758 |
| 2013/0105375 A1 | 5/2013 | Sohn et al. | |

FOREIGN PATENT DOCUMENTS

| | | |
|---|---|---|
| JP | 2005-224691 | 8/2005 |
| JP | 2009-507638 | 2/2009 |
| JP | 2009-160557 | 7/2009 |
| JP | 2010-75192 | 4/2010 |
| JP | 2011-246800 | 12/2011 |
| JP | 2012-115749 | 6/2012 |
| JP | 2013-525091 | 6/2013 |
| JP | 3187690 | 11/2013 |
| JP | 5365737 | 12/2013 |
| KR | 10-0597254 | 6/2006 |

OTHER PUBLICATIONS

Office Action issued in Japan Counterpart Patent Appl. No. 2014-022595, dated Dec. 5, 2017.

Office Action issued in Republic of Korea Counterpart Patent Appl. No. 9-5-2017-088240804, dated Dec. 16, 2017.

Office Action issued in Japan Counterpart Patent Appl. No. 2014-022595, dated Jul. 18, 2017.

* cited by examiner (a)

(b)

(c)

(a)

(b)

DEVICE FOR KILLING MICROORGANISMS WITHIN BALLAST WATER

FIELD

The present invention relates to a device for killing microorganisms which kills microorganisms existing in seawater that is taken into a ship as ballast water from a sea area of a port of call.

BACKGROUND

Ships are designed so that when loaded they can be sank enough to secure an appropriate draft and stabilized, with their propeller screw also under water. Accordingly when not loaded, ships are floated up by buoyancy too much to be stabilized or to secure a submersing depth of the propeller screw. Unloaded cargo ships and the like therefore take in the seawater at the port of call and store the seawater in the hull so as to have a height of the waterline close to that in a loaded state. The seawater taken in as above is called ballast water.

Ballast water is transported to the next port of call as a "weight" of the ship, and released when cargoes are loaded. In other words, marine organisms in the previous port of call can be brought to the next port of call. Transplanting organisms from one place to another place is likely to result in destruction or contamination of ecosystems grown by Mother Nature in the latter place. Therefore the International Maritime Organization (IMO) has adopted the Ballast Water Convention (International Convention for the Control and Management of Ships' Ballast Water and Sediments) which defines standards for an amount of organisms included in ballast water to be discharged.

According to the standards, a number of organisms of 50 µm or greater (mostly zooplankton) included in 1 $m^3$ of ballast water discharged from a ship must be less than 10. The number of organisms of greater than or equal to 10 µm and smaller than 50 µm (mostly phytoplankton) in 1 mL must be less than 10. The number of cholera bacilli in 10 mL must be less than 1 cfu. The number of *Escherichia coli* in 100 mL must be less than 250 cfu. The number of *Enterococcus* in 100 mL must be less than 100 cfu. Here, "cfu" stands for colony forming unit.

To meet the standards, microorganisms in the seawater taken in as the ballast water need to be killed. Methods for killing microorganisms in the seawater include a method for physically or mechanically killing aquatic organisms, a method for thermally killing aquatic organisms, and a method for injecting chemicals into the ballast tank or generating chlorine-based substances and the like to kill aquatic organisms.

A method for applying a voltage between electrodes to pass an electric current and electrolyze seawater to generate sodium hypochlorite has the advantages that no disinfectant needs to be supplied and the device itself can be reduced in size. Patent Literature 1 discloses a device for killing marine microorganisms which kills marine microorganisms by using physical killing power from electrical shocks in addition to chemical sterilizing power of sodium hypochlorite generated by the electrolysis of the seawater flown from one end of cylindrical electrodes.

Here, one of the electrodes (cathode side) has through holes. The other electrode is formed with a cylindrical outer surface with no hole. Generation points of chlorine gas (or hypochlorous acid) are provided on the other electrode (anode side) opposed to the holes.

CITATION LIST

Patent Literature

Patent Literature 1: Japanese Patent Application Laid-Open No. 2009-160557

SUMMARY

Technical Problem

A device for killing microorganisms requires a high treatment capacity of liquid to be treated (amount of liquid to be treated that can be passed therethrough per unit time). Microorganisms in the liquid to be treated are considered to be killed by hypochlorous acid generated between the electrodes or by electrical shocks. Keeping the microorganisms between the electrodes for a long time is thus considered to result in higher killing efficiency. In other words, to increase the treatment capacity, electrodes with long paths are required.

In contrast, as the device for killing microorganisms is to be installed in a limited space of a ship, it is desirable that the electrode length should be short enough. Accordingly, there is expected to be a critical point between the electrode length and the flow velocity of the liquid to be treated. However, no clear disclosure of the relationship between the length of the opposed electrodes and the flow velocity of the liquid to be treated has been found heretofore. Moreover, electrode-type killing devices are known to accumulate scale. Accumulation of scale increases resistance between the electrodes and decreases supply of electrons to the liquid to be treated. Such a situation suppresses the generation of hypochlorous acid. This lowers the microorganism killing effect.

Solution to Problem

In view of the foregoing problems, the present invention has been achieved to provide a device for killing microorganisms which is small in size but has high treatment capacity, wherein scale is less likely to accumulate on electrodes.

In particular, the invention has been completed as a result of finding a fact that a high microorganism killing effect can be obtained with less accumulation of scale when through holes are formed in both of opposed electrodes, the holes are arranged to be opposed to each other, and the liquid to be treated is passed between the opposed electrodes at a predetermined flow velocity.

More specifically, a device for killing microorganisms according to the present invention includes:

a main body which a liquid to be treated flows in at one end thereof and flows out at the other end;

opposed electrodes that are arranged in the main body in parallel with a flow of the liquid to be treated and have mutually-opposed through holes; and a voltage source in which an anode is connected to one of the opposed electrodes and a cathode is connected to the other of them.

Advantageous Effects of Invention

The device for killing microorganisms according to the present invention includes opposed electrodes both having through holes, wherein the through holes are arranged to be opposed to each other. Therefore a stirring action is produced between the opposed electrodes, whereby hypochlorous acid generated by the electrodes is thoroughly diffused between the opposed electrodes. Thus a high microorganism killing effect can be exhibited. In addition, since the stirring action strips off scale adhered to and accumulated in the through holes of the electrodes, the through holes will not be clogged up with the scale and the effect can be maintained for a long period of time.

DESCRIPTION OF EMBODIMENTS

A device for killing microorganisms according to the present invention will be described below with reference to the drawings. The following embodiment is a mere exemplary embodiment of the present invention, and the present invention is not limited by the following description. Modifications may be made to the following embodiment without departing from the gist of the present invention.

Figure 1:
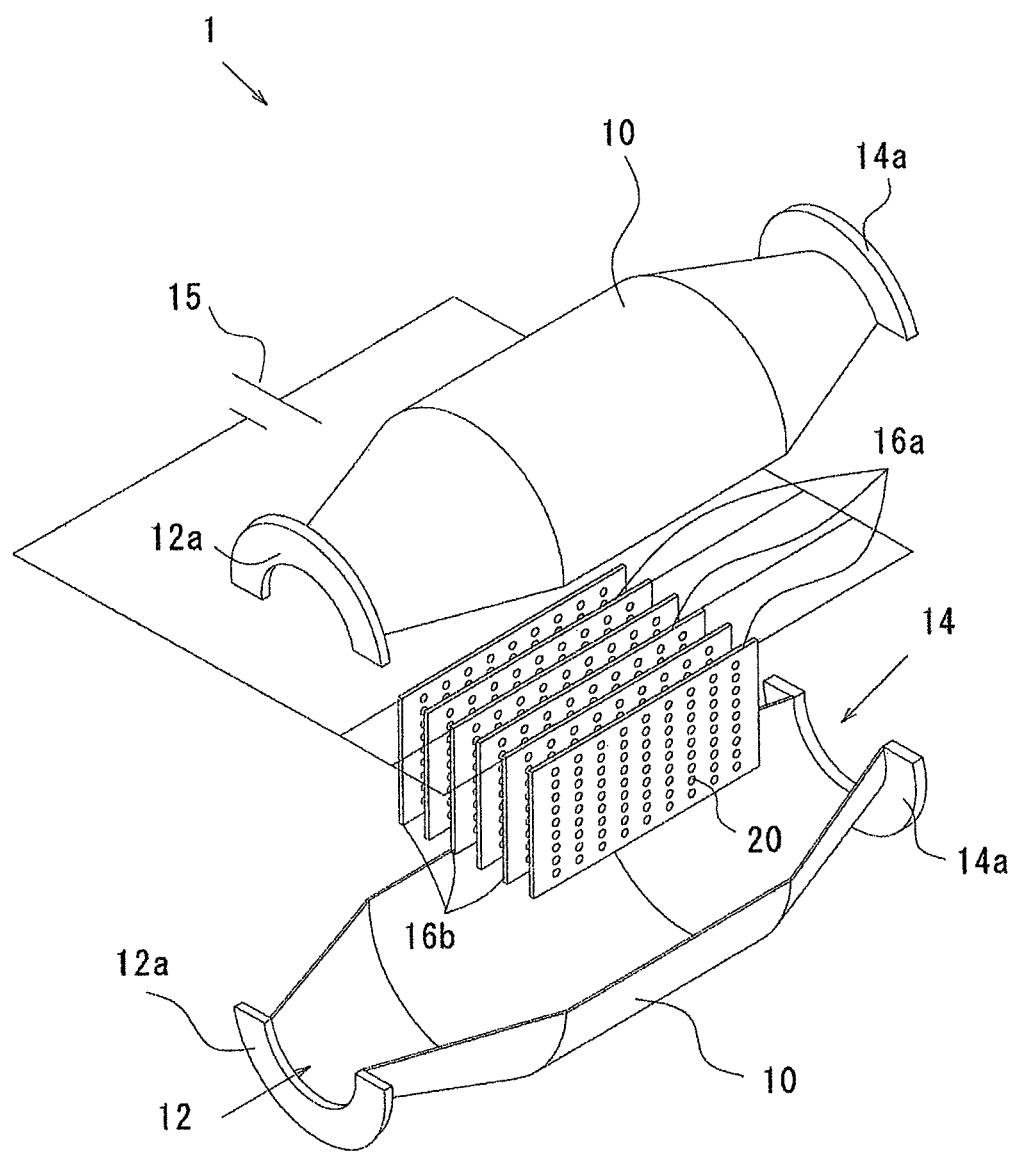
FIG. 1 is a diagram showing a configuration of a device for killing microorganisms according to the present invention.

FIG. 1 shows a configuration of a device 1 for killing microorganisms according to the present invention. The device 1 for killing microorganisms includes a main body 10 having a water inlet 12 at one end and a water outlet 14 at the other end, opposed electrodes 16a and 16b arranged in the main body 10, and a direct-current power supply 15 for applying a voltage to the opposed electrodes 16a and 16b. FIG. 1 shows the main body 10 divided into two parts, i.e. upper and lower parts. As employed herein, "liquid to be treated" includes seawater, fresh water, and a mixture of seawater and fresh water.

The main body 10 may be rectangular solid or cylindrical in shape.

The main body 10 is large enough to accommodate the opposed electrodes 16a and 16b. A material of the main body 10 is not limited to any particular material, but the main body 10 is desired to be lined with a nonconductive substance. One reason is to prevent a short circuit between the opposed electrodes 16a and 16b. The other reason is to make the body 10 resistant to corrosion due to hypochlorous acid generated by the opposed electrodes 16a and 16b. More specifically, resins, glass, ceramics, and rubber can be suitably used.

The water inlet 12 and the water outlet 14 are formed in the respective ends of the main body 10. A reason is that the liquid to be treated is desired to flow uniformly through a cross section of the interior of the main body 10 as seen from the water inlet 12. Mounting flanges 12a and 14a to be connected with piping for the liquid to be treated may be provided around the water inlet 12 and the water outlet 14.

The opposed electrodes 16a and 16b are accommodated in the main body 10.

There may be a plurality of pairs of opposed electrodes 16a and 16b. The opposed electrodes 16a are anodes (anode side). Materials such as titanium and stainless steel (SUS) coated with platinum, ruthenium, iridium, or an alloy thereof are suitably used. The opposed electrodes 16b are cathodes (cathode side). Materials such as titanium and stainless steel (SUS) are suitably used. As employed herein, the anodes and the cathodes are of electrolytic terms.

Both the opposed electrodes 16a and 16b are desired to have a thickness of 0.5 mm to 2.0 mm. Because thin opposed electrodes lack mechanical strength, and too thick electrodes lead to increased electrical resistance. Both the opposed electrodes 16a and 16b have through holes 20.

The through holes 20 have a diameter of 5 mm to 20 mm, and preferably 5 mm to 10 mm. When the hole diameter is too small, a stirring action to be described later is less likely to occur. When the hole diameter is too large, electrode length required to obtain a necessary killing effect increases, and is thus impractical in a hull with a limited installation space. The shape of the through holes 20 is not limited in particular. A circular shape without corners formed by straight lines is desirable. Corners formed by the straight lines accumulate scale which does not come off easily. Circular holes can also accumulate scale, which, however, is taken off with the flow of the liquid to be treated before the holes are clogged up. That is, the holes without corners are less likely to accumulate the scale even over a long period of use.

FIG. 2(a) shows a front view of one opposed electrode 16a as an example. The through holes 20 are formed in both the opposed electrodes 16a and 16b. The through holes 20 in the opposed electrodes 16a and 16b are positioned to oppose each other. As employed herein, "oppose" refers to that when the opposed electrodes 16a and 16b are lapped and observed, there are portions where light passes through the through holes 20 of one electrode and the other electrode.

Figure 2:
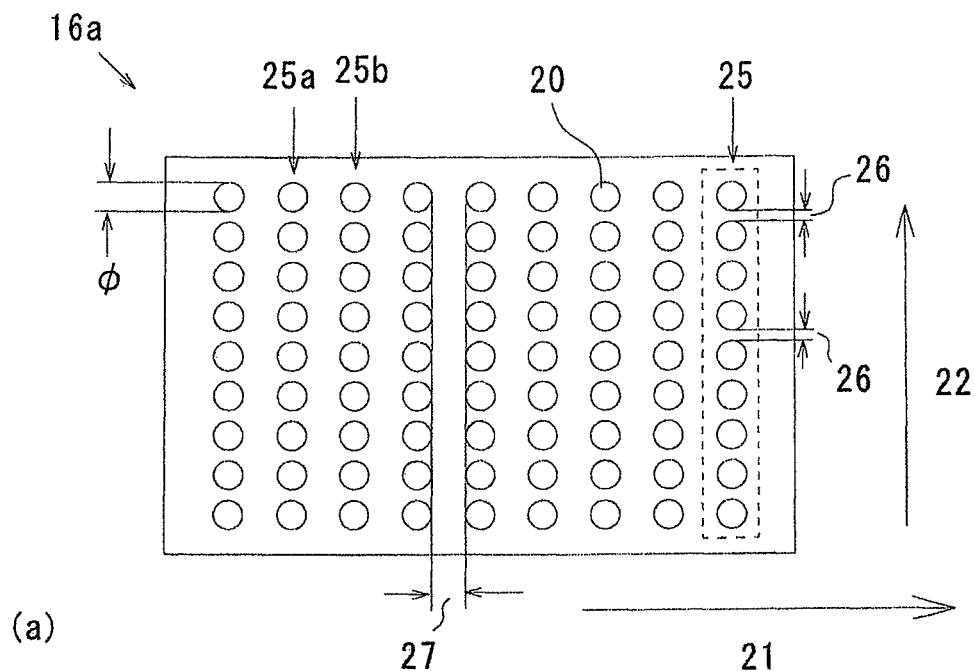
FIG. 2 is a diagram showing in (a) (c) opposed electrodes.
Figure 2:
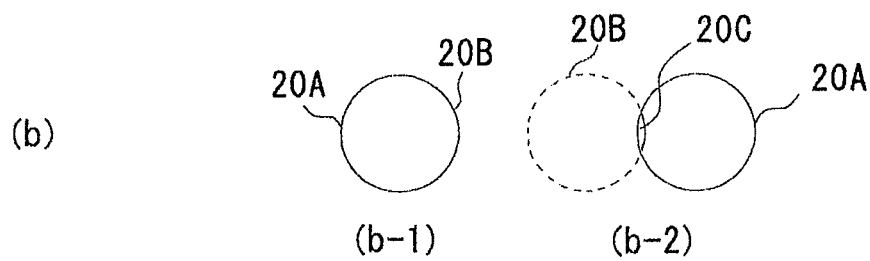
Figure 2:
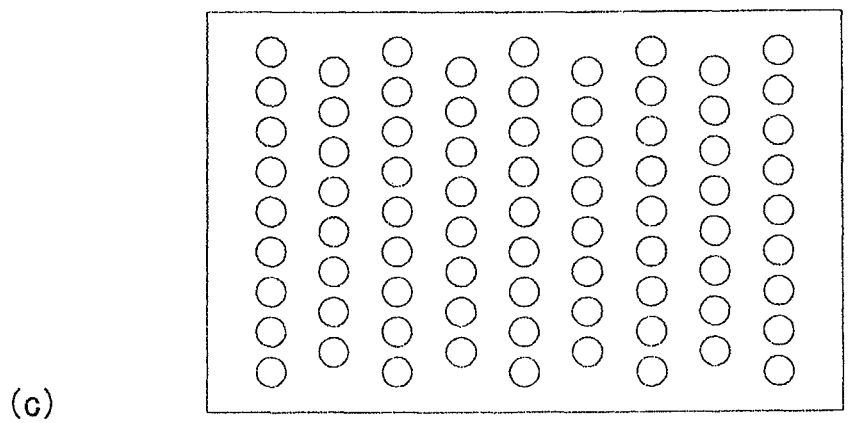

FIG. 2(b) shows a view from one opposed electrode 16a when the opposed electrodes 16a and 16b are in an installed position. The through holes 20A of the opposed electrode 16a are shown in solid lines. Through holes 20B of the opposed electrode 16b are shown in broken lines. The positional relationship of the through hole 20A and the through hole 20B being opposed to each other includes the positional relationships from a state of the through hole 20B fully aligned with the through hole 20A (FIG. 2(b-1)) to a state of the through hole 20A and the through hole 20B overlapped even slightly to have a through portion 20C (FIG. 2(b-2)).

FIG. 2(a) shows a case where the through holes 20 are regularly arranged. An arrow 21 indicates the direction in which the liquid to be treated flows. The through holes 20 are arranged and formed in rows in a direction (the direction of the arrow 22) orthogonal to the direction in which the liquid to be treated flows (the arrow 21). The direction in which the liquid to be treated flows (the arrow 21) is referred to as a "length" of the opposed electrodes 16a and 16b. The direction (the direction of the arrow 22) orthogonal to the direction in which the liquid to be treated flows (the arrow 21) is referred to as a "height" of the opposed electrodes 16a and 16b. In FIG. 2(a), a dimension in a depth direction on a diagram is referred to as a "thickness" of the opposed electrodes 16a and 16b.

In FIG. 2(a), rows of the through holes 20 (which are referred to as "through hole rows") are denoted by a reference numeral 25. In one through hole row 25, distances 26 between the adjacent through holes 20 are desired to be made equal. With respect to the diameter of the through holes 20, the through holes 20 are desired to be arranged at distances 26 of $0.1\varphi$ to $5.0\varphi$ (where "$\varphi$" is the diameter of the through holes 20).

Adjoining through hole rows 25a and 25b are desired to include almost the same numbers of through holes 20. The through hole rows 25 may be arranged in a staggered pattern (see FIG. 2(c)). As employed herein, the staggered pattern refers to a state where the through holes 20 of the adjoining through hole rows 25 are arranged in a staggered manner as viewed from the direction in which the liquid to be treated flows (the direction of the arrow 21). With respect to the diameter of the through holes 20, the distance 27 between the through hole rows 25 is desired to be $0.1\varphi$ to $5.0\varphi$ (where the "$\varphi$" is the diameter of the through holes 20).

The number of through hole rows 25 to be arranged is determined according to flow velocity of the liquid to be treated flowing along the opposed electrodes 16a and 16b. As seen from examples to be hereinafter described, when the through holes 20 are regularly arranged, the number of through hole rows 25 is desired to be 25 (rows/flow velocity) or greater. For example, in a case of the opposed electrodes 16a and 16b with 30 through hole rows 25 being arranged therein, the liquid to be treated should be flown at a flow velocity (v) of 1.2 m/sec or lower. ($v \leq 30$ (rows)/25 (rows/flow velocity))

The shape of the opposed electrodes 16a and 16b in such a case can be described as follow: Supposing that the through holes 20 have a diameter $\varphi$ of 8 mm, the distance between the through hole rows 25 is 2 mm, and the margins on both sides are 10 mm, length of the opposed electrodes 16a and 16b is approximately 318 mm (8 mm×30 rows+2 mm×29+10 mm×2).

The significance of the present invention lies in that a minimum value of the number of rows per unit flow velocity is defined. The reason is that at a given flow velocity of the liquid to be treated, the number of rows per unit flow velocity can be arbitrarily increased by increasing the length of the opposed electrodes 16a and 16b. For example, when the liquid to be treated flows at a flow velocity of 1.2 m/sec as in the foregoing example and the number of through hole rows 25 is 30 (the length of the opposed electrodes 16a and 16b is approximately 300 mm as described above), the number of rows per unit flow velocity is 25.

When the length of the opposed electrodes 16a and 16b is increased to 3000 mm (3 m), 300 through hole rows 25 are formed, and the number of rows per unit flow velocity is 250. Even with such long opposed electrodes 16a and 16b the effect of the present invention of killing microorganisms is secured. As the maximum electrode length is determined according to the size of the hull, the upper limit of the number of rows per unit flow velocity is determined based on the maximum electrode length.

The opposed electrodes 16a and 16b should be arranged at a distance of substantially 1 mm to 20 mm. When the distance is too narrow, a short circuit is likely to occur. The flow velocity resistance of the liquid to be treated also increases. In contrast, when the distance is too large, the electric resistance between the opposed electrodes 16a and 16b increases, and voltage of the direct-current power supply 15 needs to be increased. The opposed electrodes 16a and 16b are arranged inside the main body 10 in parallel with the flow of the water flowing from the water inlet 12 to the water outlet 14.

Figure 3:
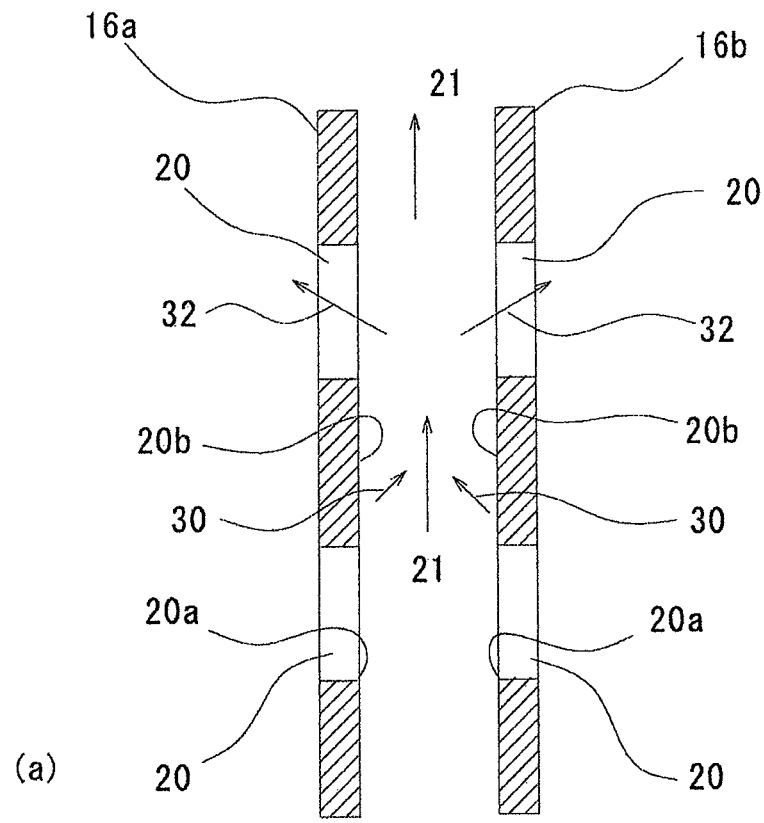
FIG. 3 is a diagram for describing in (a) and (b) a flow of liquid to be treated between opposed electrodes.
Figure 3:
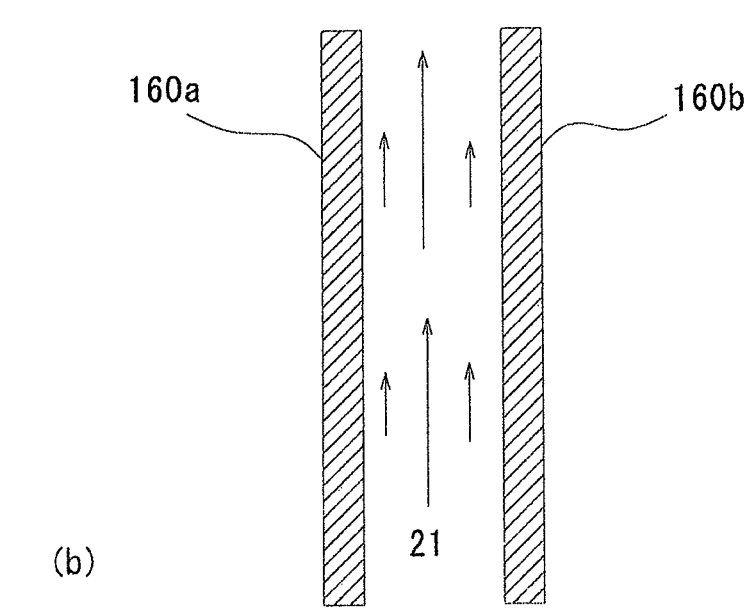

Having the foregoing configuration, the device 1 for killing microorganisms according to the present invention exhibits a high killing effect, and, in addition, scale is less likely to accumulate on the opposed electrodes 16a and 16b. Possible reasons are as follows:

FIG. 3(a) shows part of a cross section of the opposed electrodes 16a and 16b. When the opposed through holes 20 are arranged in parallel with the direction 21 in which the liquid to be treated flows, the liquid to be treated undergoes compressive force 30 from plate portions 20b without any through holes 20, and the pressure is released in portions with the through holes 20. Consequently, it is considered that there is liquid to be treated 32 passing through the through holes 20 in the portions with the through holes 20. In other words, where the through holes 20 are opposed to each other, eddies can be generated.

The liquid to be treated 32 flows intricately between a plurality of the adjoining opposed electrodes 16a and 16b, whereby hypochlorous acid generated by electrolysis by the opposed electrodes 16a and 16b is diffused throughout the main body 10. This increases chances for microorganisms to encounter the hypochlorous acid.

The liquid to be treated 32 passing through the through holes 20 further brings about the effect of taking off the scale growing in the through holes 20 to come off.

FIG. 3(b) shows opposed electrodes 160a and 160b formed with flat plates having no through hole 20. When the opposed electrodes 160a and 160b are formed with the flat plates, the flow of the liquid to be treated flowing between the electrodes along the direction 21 is laminar flow. In other words, the closer the liquid to be treated comes to the opposed electrodes 160a and 160b, the lower the flow velocity is. In such a case, hypochlorous acid generated in the anode side simply flows near the opposed electrode 160a in the direction 21 in which the liquid to be treated flows. Thus, microorganisms drifting along the flow near the opposed electrode 160b (cathode) do not encounter the hypochlorous acid without being killed.

Figure 4:
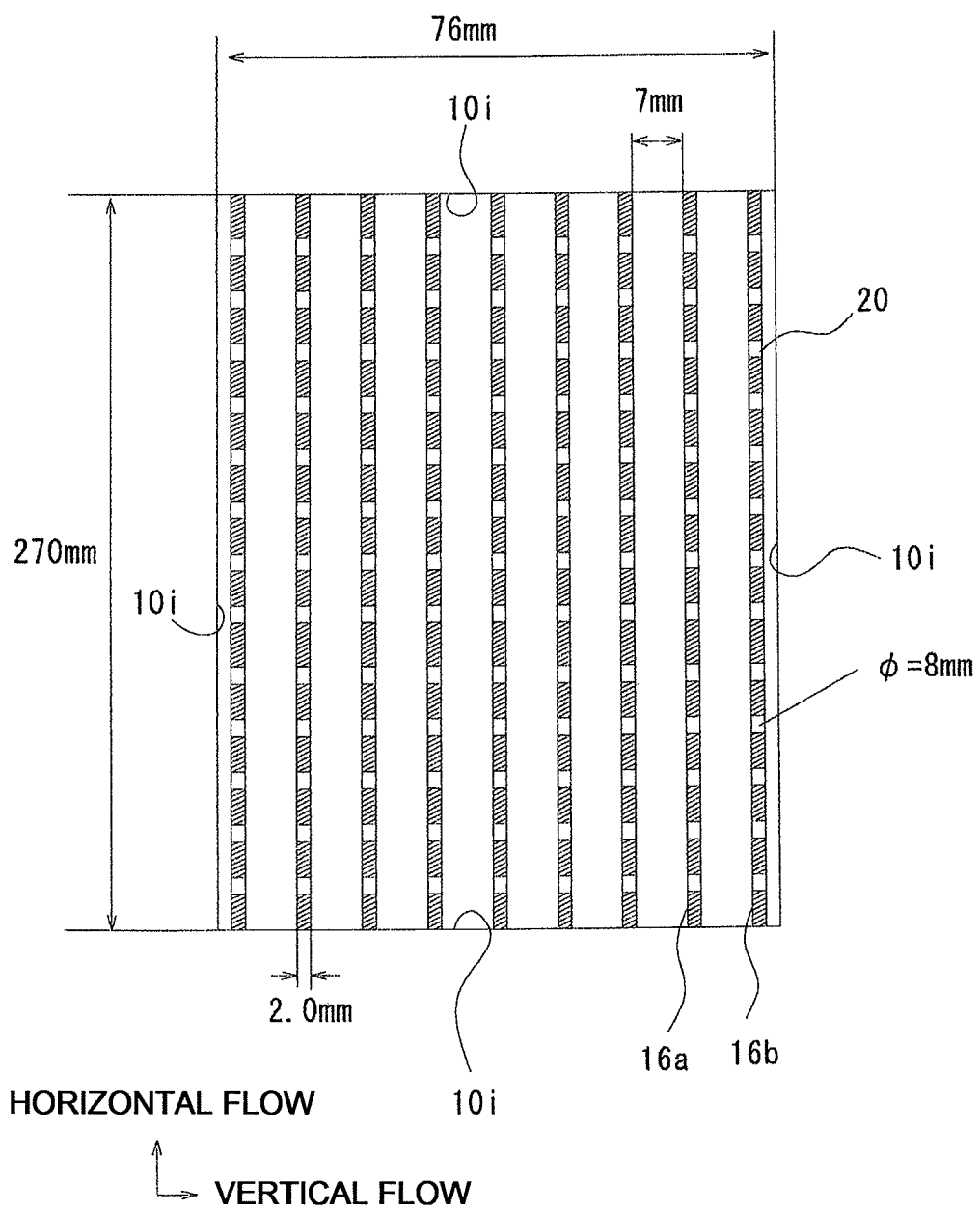
FIG. 4 is a diagram showing a simulation condition.

Speed of flow parallel with and orthogonal to the direction 21 in which the liquid to be treated flows was simulated for situations with and without through holes 20. FIG. 4 shows a condition with which the state of the flow was simulated. The nine opposed electrodes 16a and 16b were used in total, and each opposed electrode has a size of 270 mm×130 mm and a thickness of 2.0 mm. Through holes 20 are arranged at regular intervals, wherein the through holes 20 are round and have a diameter of 8 mm. Thirteen through holes 20 were provided in a length direction (the direction of the direction 21 in which the liquid to be treated flows), and fifteen in a height direction.

The distance between the opposed electrodes 16a and 16b was 7 mm. Inner walls 10i of the main body 10 were respectively positioned 1 mm outside the opposed electrodes 16a and 16b on both sides. In FIG. 4, the dimension in the direction orthogonal to the length direction is thus 76 mm. Inner walls 10i of the main body 10 were similarly provided above and below the opposed electrodes 16a and 16b 3 mm from the sides of the opposed electrodes 16a and 16b. The main body 10 thus has a shape of rectangular solid. Water to be treated was assumed to flow at 1.2 m/sec across an entire width of the main body 10.

For a simulation software, "SCRYU/Tetra (registered trademark)" manufactured by Software Cradle Co., Ltd. was used. Table 1 shows average values regarding flows in a direction parallel to the liquid to be treated (horizontal flow) and in a direction perpendicular thereto (vertical flow) with respect to all elements other than the inner walls 10i and the opposed electrodes 16a and 16b.

TABLE 1

|  | FLAT PLATES | WITH HOLES |
| --- | --- | --- |
| HORIZONTAL FLOW (m/sec) | 1.19 | 1.089 |
| VERTICAL FLOW (m/sec) | 0.024 | 0.052 |
| VERTICAL/HORIZONTAL | 0.020 | 0.048 |

Referring to Table 1, when there was no through hole 20 (flat plates), the average value of the "horizontal flow" was 1.19 m/sec, and the average value of the "vertical flow" was 0.024 m/sec. In contrast, when there were holes 20 (with holes), the average value of the "horizontal flow" was 1.089 m/sec, and the average value of the "vertical flow" was 0.052 m/sec which is more than twice the flow in the vertical direction with no through hole 20. The ratio of the "vertical flow/horizontal flow" also reflects a difference in a velocity component of the "vertical flow." The ratio in a case of having through holes 20 is more than twice that in the case of the flat plates.

In such a manner, when a straight flow is passed between the opposed electrodes 16a and 16b having the opposed through holes 20, a stirring action is exerted between the electrodes 16a and 16b. The stirring action diffuses the hypochlorous acid generated near the anodes to the cathode side, which results in a higher microorganism killing effect.

Figure 5:
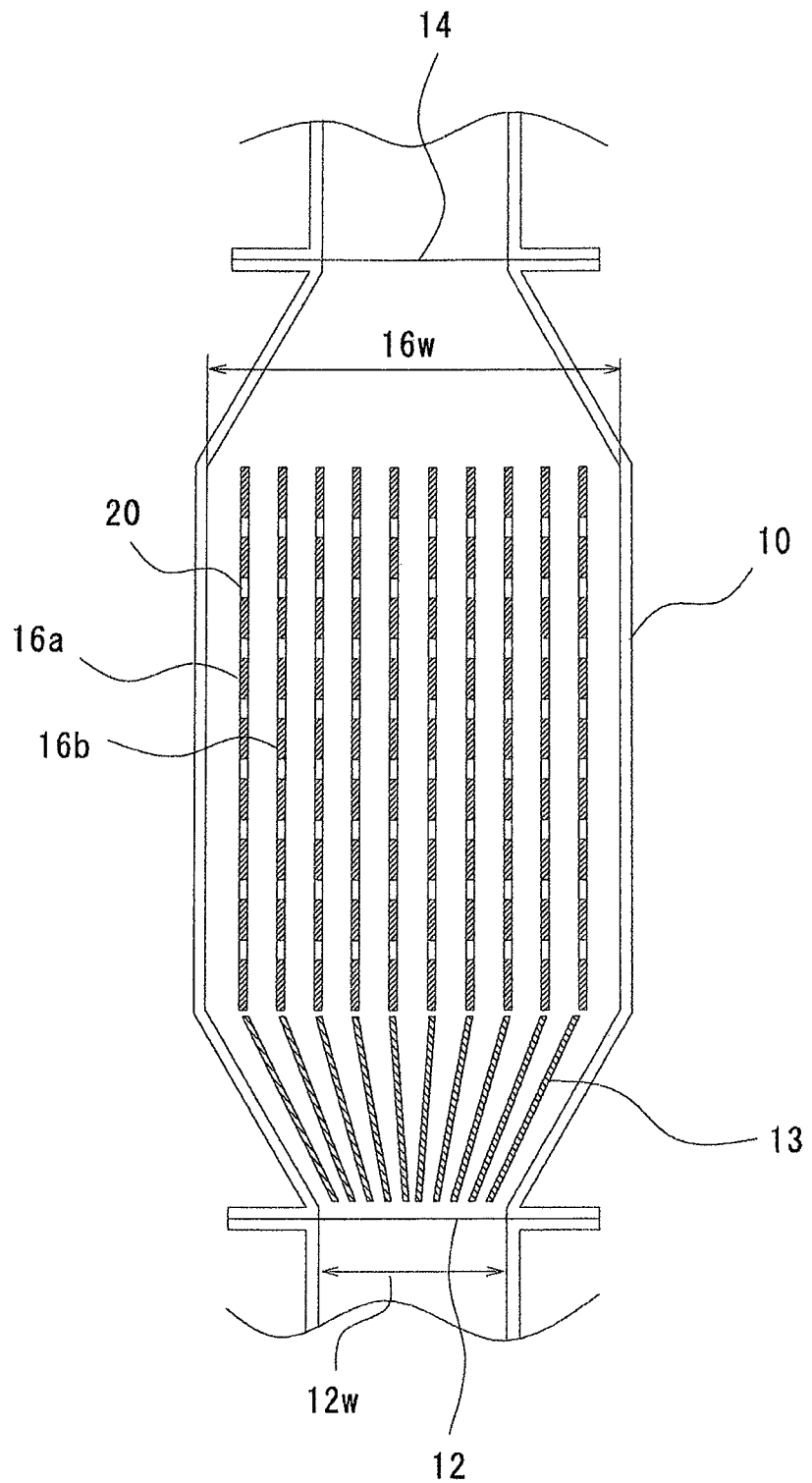
FIG. 5 is a diagram showing a configuration including straightening vanes.

FIG. 5 shows an example where straightening vanes 13 are provided between the water inlet 12 and the opposed electrodes 16a and 16b inside the main body 10 of the device 1 for killing microorganisms. The device 1 for killing microorganisms according to the present invention exerts the stirring action between the opposed electrodes 16a and 16b. The liquid to be treated to be passed between the opposed electrodes 16a and 16b therefore do not need to be applied with an eddy component. In other words, the microorganism killing effect improves by supplying a straightened flow of the liquid to be treated to the opposed electrodes 16a and 16b.

FIG. 5 shows the straightening vanes 13 extending uniformly from a width 12w of the water inlet 12 to a width 16w of the opposed electrodes 16a and 16b. However, the shape of the straightening vanes 13 is not limited thereto. Straightening vanes to be provided to supply uniform flow between the opposed electrodes 16a and 16b do not necessarily need to produce a completely straight flow.

EXAMPLES

Examples of the device 1 for killing microorganisms according to the present invention is described below.

Example 1

Ten pairs of opposed electrodes 16a and 16b having a length of 260 mm and a height of 130 mm were accommodated in a 3-liter main body 10 to fabricate a device 1 for killing microorganisms. Each electrode had 25 through hole rows 25 wherein the each through hole row is provided with seven to eight through holes ($\varphi$8 mm). The number of through holes 20 per electrode was 187. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.6 m/sec. The number of rows per flow velocity was 43.1 (rows/(m/sec)). Immediately after killing treatment, the treated seawater was observed under a 40× microscope to count the number of surviving copepods of 100 μm or greater, and no surviving copepod of 100 μm or greater was found. The condition and the result are shown in Table 2. The resulting value sufficiently reached the IMO standard.

In the present example and all the following examples and comparative examples, the seawater used included around 10000 to 100000 copepods/m$^3$. In the present example and all the following examples and comparative examples, the cathodes of the opposed electrodes 16a and 16b were made of titanium, and the anodes were formed of titanium coated with a platinum-type metal composite alloy.

Example 2

Ten pairs of opposed electrodes 16a and 16b having a length of 130 mm and a height of 130 mm were accommodated in a 3-liter main body 10 to fabricate a device 1 for killing microorganisms. Each electrode had 12 through hole rows 25 wherein the each through hole row is provided with seven to eight through holes ($\varphi$8 mm). The number of through holes 20 per electrode was 90. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.4 m/sec. The number of rows per flow velocity was 30.0 (rows/(m/sec)). Immediately after killing treatment, the treated seawater was observed under a 40× microscope to count the number of surviving copepods of 100 μm or greater, and no surviving copepod of 100 μm or greater was found. The condition and the result are shown in Table 2. The resulting value sufficiently reached the IMO standard.

Example 3

Ten pairs of opposed electrodes 16a and 16b having a length of 260 mm and a height of 130 mm were accommodated in a 3-liter main body 10 to fabricate a device 1 for killing microorganisms. Each electrode had 25 through hole rows 25 wherein the each through hole row is provided with seven to eight through holes ($\varphi$8 mm). The number of through holes 20 per electrode was 187. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.8 m/sec. The number of rows per flow velocity was 30.5 (rows/(m/sec)). Immediately after killing treatment, the treated seawater was observed under a 40× microscope to count the number of surviving copepods of 100 μm or greater, and no surviving copepod of 100 μm or greater was found to be zero. The condition and the result are shown in Table 2. The resulting value sufficiently reached the IMO standard.

Example 4

Ten pairs of opposed electrodes 16a and 16b having a length of 520 mm and a height of 130 mm were accommodated in a 6-liter main body 10 to fabricate a device 1 for killing microorganisms. Each electrode had 50 through hole rows 25 wherein the each through hole row is provided with seven to eight through holes ($\varphi$8 mm). The number of through holes 20 per electrode was 374. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 1.7 m/sec. The number of rows per flow velocity was 30.1 (rows/(m/sec)). Immediately after killing treatment, the treated seawater was observed under a 40× microscope to count the number of surviving copepods of 100 μm or greater, and no surviving copepod of 100 μm or greater was found. The condition and the result are shown in Table 2. The resulting value sufficiently reached the IMO standard.

Example 5

Ten pairs of opposed electrodes 16a and 16b having a length of 130 mm and a height of 130 mm were accommodated in a 3-liter main body 10 to fabricate a device 1 for killing microorganisms. Each electrode had 12 through hole rows 25 wherein the each through hole row is provided with seven to eight through holes ($\varphi$8 mm). The number of through holes 20 per electrode was 90. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.5 m/sec. The number of rows per flow velocity was 25.5 (rows/(m/sec)). Immediately after killing treatment, the treated seawater was observed under a 40× microscope to count the number of surviving copepods of 100 μm or greater, and no surviving copepod of 100 μm or greater was found to be zero. The condition and the result are shown in Table 2. The resulting value sufficiently reached the IMO standard.

Example 6

Ten pairs of opposed electrodes 16a and 16b having a length of 260 mm and a height of 130 mm were accommodated in a 3-liter main body 10 to fabricate a device 1 for killing microorganisms. Each electrode had 25 through hole rows 25 wherein the each through hole is provided with seven to eight through holes ($\varphi$8 mm). The number of through holes 20 per electrode was 187. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.9 m/sec. The number of rows per flow velocity was 26.6 (rows/(m/sec)). Immediately after killing treatment, the treated seawater was observed under a 40× microscope to count the number of surviving copepods of 100 µm or greater, and no surviving copepod of 100 µm or greater was found. The condition and the result are shown in Table 2. The resulting value sufficiently reached the IMO standard.

Example 7

Ten pairs of opposed electrodes 16a and 16b having a length of 130 mm and a height of 130 mm were accommodated in a 3-liter main body 10 to fabricate a device 1 for killing microorganisms. Each electrode had 12 through hole rows 25 wherein the each through hole row is provided with seven to eight through holes (φ8 mm). The number of through holes 20 per electrode was 90. A direct-current voltage of 4 V was applied between the opposed electrodes 16a and 16b. The concentration of hypochlorous acid was adjusted to be 12 mg/L at the water outlet 14.

Seawater sampled off the coast of Oita in August was passed through the device 1 at a flow velocity of 0.4 m/sec for 4 hours. The number of rows per flow velocity was 30.0 (rows/(m/sec)). After that, one ton of seawater was passed through the device 1 at a flow velocity of 0.4 m/sec. Then, the number of surviving copepods of 100 µm or greater in one ton of seawater was counted under a 40× microscope, and no surviving copepod of 100 µm or greater was found. None of the through holes 20 in the opposed electrodes 16a and 16b tested was clogged up with scale. No accumulation of scale in the through holes 20 was observed, either. The condition and the result are shown in Table 2. The resulting value sufficiently reached the IMO standard.

Comparative Example 1

Ten pairs of opposed electrodes 16a and 16b having a length of 260 mm and a height of 130 mm were accommodated in a 3-liter main body 10 to fabricate a device 1 for killing microorganisms. Each electrode had 25 through hole rows 25 wherein the each through hole row is provided with seven to eight through holes (φ8 mm). The number of through holes 20 per electrode was 187. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 1.06 m/sec. The number of rows per flow velocity was 23.6 (rows/(m/sec)). Immediately after killing treatment, the treated seawater was observed under a 40× microscope to count the number of surviving copepods of 100 µm or greater, and six surviving copepods of 100 µm or greater were found. The condition and the result are shown in Table 2.

Comparative Example 2

Ten pairs of opposed electrodes 16a and 16b having a length of 260 mm and a height of 130 mm were accommodated in a 3-liter main body 10 to fabricate a device 1 for killing microorganisms. Each electrode had the shape of a flat plate without a through hole 20. A direct-current voltage of 4 V was applied between the opposed electrodes 16a and 16b. The concentration of hypochlorous acid was adjusted to be 15 mg/L at the water outlet 14. One ton of seawater sampled of the coast of Oita in August was passed through the device 1 at a flow velocity of 0.52 m/sec. Immediately after killing treatment, the treated seawater was observed under a 40× microscope to count the number of surviving copepods of 100 µm or greater, and 14 surviving copepods of 100 µm or greater were found. The condition and the result are shown in Table 2.

Comparative Example 3

Ten pairs of opposed electrodes 16a and 16b having a length of 260 mm and a height of 130 mm were accommodated in a 3-liter main body 10 to fabricate a device 1 for killing microorganisms. For the electrode plates, cathodes were made of titanium and anodes were formed of titanium coated with a platinum-type metal composite alloy. Slits were formed in the plates in a staggered pattern, and the plates were expanded and worked into mesh-like expanded metal. In Table 2, such electrode plates are represented by "mesh." The wire diameter was 1.5 mm. The openings in the expanded metal had a major diameter of 6 mm and a minor diameter of 3 mm. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.4 m/sec. Immediately after killing treatment, the treated seawater was observed under a 40× microscope to count the number of surviving copepods of 100 µm or greater, and no surviving copepod of 100 µm or greater was found. The condition and the result are shown in Table 2.

Comparative Example 4

Ten pairs of opposed electrodes 16a and 16b having a length of 260 mm and a height of 130 mm were accommodated in a 3-liter main body 10 to fabricate a device 1 for killing microorganisms. For the electrode plates, cathodes were made of titanium and anodes were formed of titanium coated with a platinum-type metal composite alloy. Slits were formed in the plates in a staggered pattern, and the plates were expanded and worked into mesh-like expanded metal. In Table 2, such electrode plates are represented by "mesh." The wire diameter was 1.5 mm. The openings in the expanded metal had a major diameter of 6 mm and a minor diameter of 3 mm. A direct-current voltage of 4 V was applied between the opposed electrodes 16a and 16b. The concentration of hypochlorous acid was adjusted to be 12 mg/L at the water outlet 14.

One ton of seawater sampled off the coast of Oita in August was passed through the device 1 at a flow velocity of 0.4 m/sec for 4 hours. After that, one ton of seawater was passed through the device 1 at a flow velocity of 0.4 m/sec. Then, the number of surviving copepods of 100 µm or greater in one ton of seawater was counted under a 40× microscope, and six surviving copepods of 100 µm or greater were found. After the test, there was scale adhering to the opposed electrodes. The openings in the expanded metal were clogged up like a flat plate. The condition and result are shown in Table 2.

TABLE 2

| | ELECTRODE SHAPE | ELECTRODE SIZE (LENGTH HEIGHT) [mm × mm] | NUMBER OF PAIRS OF ELECTRODES [PAIRS] | MAIN BODY CAPACITY [L] | HYPOCHLOROUS ACID CONCENTRATION [mg/L] | FLOW VELOCITY [m/sec] | NUMBER OF HOLES [HOLES/ELECTRODE] | NUMBER OF ROWS [ROWS] | NUMBER OF ROWS/FLOW VELOCITY [ROWS/(m/sec)] | NUMBER OF SURVIVING MICRO-ORGANISMS [number/m³] |
|---|---|---|---|---|---|---|---|---|---|---|
| EXAMPLE 1 | WITH THROUGH HOLES (φ8) | 260 × 130 | 10 | 3 | 12 | 0.6 | 187 | 25 | 43.1 | 0 |
| EXAMPLE 2 | WITH THROUGH HOLES (φ8) | 130 × 130 | 10 | 3 | 12 | 0.4 | 90 | 12 | 30.0 | 0 |
| EXAMPLE 3 | WITH THROUGH HOLES (φ8) | 260 × 130 | 10 | 3 | 12 | 0.8 | 187 | 25 | 30.5 | 0 |
| EXAMPLE 4 | WITH THROUGH HOLES (φ8) | 520 × 130 | 10 | 6 | 12 | 1.7 | 374 | 50 | 30.1 | 0 |
| EXAMPLE 5 | WITH THROUGH HOLES (φ8) | 130 × 130 | 10 | 3 | 12 | 0.5 | 90 | 12 | 25.5 | 0 |
| EXAMPLE 6 | WITH THROUGH HOLES (φ8) | 260 × 130 | 10 | 3 | 12 | 0.9 | 187 | 25 | 26.6 | 0 |
| EXAMPLE 7 | WITH THROUGH HOLES (φ8) | 130 × 130 | 10 | 3 | 12 | 0.4 | 90 | 12 | 30.0 | 0 |
| COMPARATIVE EXAMPLE 1 | WITH THROUGH HOLES (φ8) (AFTER 4 HOURS) | 260 × 130 | 10 | 3 | 12 | 1.06 | 187 | 25 | 23.6 | 6 |
| COMPARATIVE EXAMPLE 2 | WITHOUT THROUGH HOLES (FLAT PLATE) | 260 × 130 | 10 | 3 | 15 | 0.52 | — | — | — | 14 |
| COMPARATIVE EXAMPLE 3 | MESH (IMMEDIATELY AFTER START OF OPERATION) | 260 × 130 | 10 | 3 | 12 | 0.4 | — | — | — | 0 |
| COMPARATIVE EXAMPLE 4 | MESH (AFTER 4 HOURS) | 260 × 130 | 10 | 3 | 12 | 0.4 | — | — | — | 6 |

Referring to Table 2, no surviving microorganism (copepod) was observed in any of the conditions of Examples 1 to 7 with opposed through holes 20. No accumulation of scale in the through holes 20 was observed even after four hours of continuous operation.

Even when the opposed electrodes 16a and 16b having the opposed through holes 20 were used, the presence of surviving microorganisms was observed in the water to be treated when treated at a high flow velocity (Comparative Example 1). The reason is considered that when the flow velocity of the liquid to be treated is high, the opposed electrodes 16a and 16b having the opposed through holes 20 fail to exert the stirring action of eddy components produced by the opposed through holes 20, and hypochlorous acid fails to be diffused throughout the main body 10.

Even when the opposed electrodes had the same size but without through holes 20, surviving microorganisms (copepods) were observed in the liquid to be treated (Comparative Example 2). This coincides with the conventional knowledge. The reason is considered that, as shown in FIG. 4 and by the simulation described in Table 1, the stirring action is not exerted on the liquid to be treated and hypochlorous acid fails to be diffused between the opposed electrodes 16a and 16b.

If the opposed electrodes were formed of expanded metal having a similar shape to that of the opposed electrodes 16a and 16b having the opposed through holes 20, the microorganism killing effect was as high as in the examples (Comparative Example 3). This shows that the stirring effect on the hypochlorous acid is effective at increasing the microorganism killing effect.

However, the cathodes of the expanded metal shape were covered with scale to be in a state of a flat plate after four hours of continuous operation. The meshes of the expanded metal are not flat but have a three-dimensional shape at the joint portions of the meshes. The reason is considered that scale accumulating on the portions of the three-dimensional shape was fixed and failed to come off even if turbulence occurred due to eddy components between the opposed electrodes.

INDUSTRIAL APPLICABILITY

The device for killing microorganisms according to the present invention can be suitably used in killing microorganisms within a liquid taken into a hull as ballast water.

REFERENCE SIGNS LIST 1 device for killing microorganisms
10 main body
10i inner wall
12 water inlet
12w width
12a, 14a flange
13 straightening vane
14 water outlet
15 direct-current power supply
16a, 16b opposed electrodes
16w width
20, 20A, 20B through hole
20C through portion
21 direction in which the liquid to be treated flows
22 direction orthogonal to the direction in which the liquid to be treated flows
25, 25a, 25b through hole row
26 distance between through holes
27 distance between through hole rows
30 compressive force
32 liquid to be treated passing through the through holes
20b plate portion
20a edge
160a, 160b opposed electrodes

The invention claimed is:

1. A device for killing microorganisms, comprising:
a main body configured to convey a liquid to be treated such that the liquid to be treated flows into the main body at one end and flows out of the main body at another end that is opposite the one end;
opposed electrodes arranged in the main body so as to be oriented in respective planes that are parallel with a direction of flow from the one end to the another end, the opposed electrodes having mutually-opposed through holes; and
a voltage source with an anode being connected to one of the opposed electrodes and a cathode being connected to another of the opposed electrodes, and
wherein the opposed electrodes are configured to allow the liquid to be treated to flow between the opposed electrodes along the respective planes,
wherein a plurality of the through holes, each having a diameter ($\varphi$), are arranged in a direction orthogonal to the flow of the liquid to be treated to form a plurality of rows,
wherein each of the plurality of rows are spaced apart in the direction of the flow,
wherein a distance between adjacent through holes in each of the plurality of rows is within $0.1\varphi$ to $5.0\varphi$, and
wherein a distance between adjacent ones of the plurality of rows is within $0.1\varphi$ to $5.0\varphi$.

2. The device for killing microorganisms according to claim 1, wherein 25 or greater of the rows are arranged per unit flow velocity of the liquid to be treated in the direction of the flow of the liquid to be treated.

3. The device for killing microorganisms according to claim 1, comprising a straightening vane in an upstream side of the opposed electrodes.

4. The device for killing microorganisms according to claim 1, wherein a flow velocity of the liquid to be treated falls in a range from 0.1 msec to 10.0 msec.

5. The device for killing microorganisms according to claim 1, wherein a distance between the opposed electrodes falls in a range from 1 mm to 20 mm.

6. The device for killing microorganisms according to claim 1, wherein the voltage source is a direct-current power supply.

* * * * *